(12) United States Patent
Kapoor

(10) Patent No.: US 12,422,094 B2
(45) Date of Patent: Sep. 23, 2025

(54) SWIVEL EYELET FOR HANGING ARTICLES

(71) Applicant: Rajan Kapoor, New Delhi (IN)

(72) Inventor: Rajan Kapoor, New Delhi (IN)

( * ) Notice: Subject to any disclaimer, the term of this patent is extended or adjusted under 35 U.S.C. 154(b) by 0 days.

(21) Appl. No.: 18/281,315

(22) PCT Filed: Feb. 22, 2023

(86) PCT No.: PCT/IN2023/050171
§ 371 (c)(1),
(2) Date: Sep. 11, 2023

(87) PCT Pub. No.: WO2024/069639
PCT Pub. Date: Apr. 4, 2024

(65) Prior Publication Data
US 2025/0027604 A1    Jan. 23, 2025

(30) Foreign Application Priority Data
Sep. 29, 2022 (IN) .............................. 202211056051

(51) Int. Cl.
*F16L 3/08* (2006.01)
*F16M 11/10* (2006.01)
*F16M 13/02* (2006.01)

(52) U.S. Cl.
CPC .......... *F16M 13/027* (2013.01); *F16M 11/10* (2013.01)

(58) Field of Classification Search
CPC ........................... F16M 13/027; F16M 11/10
See application file for complete search history.

(56) References Cited

U.S. PATENT DOCUMENTS

| | | | | |
|---|---|---|---|---|
| 4,465,252 A | * | 8/1984 | Donovan, Jr. | ............ F16L 3/20 248/589 |
| 4,730,800 A | * | 3/1988 | Engman | .................. E21F 17/02 248/74.1 |
| 9,239,067 B2 | * | 1/2016 | Heath | ........................ F16L 3/24 |
| 9,631,743 B2 | * | 4/2017 | Richter | ................. F16B 21/165 |
| 2003/0102170 A1 | * | 6/2003 | Simons | ............. G01G 23/3728 177/211 |

* cited by examiner

*Primary Examiner* — Amy J. Sterling

(57) ABSTRACT

The present invention provides a swivel eyelet for hanging or suspending articles above the ground, e.g., on a ceiling, at any desired angle, example including and not limited to 30°, 45°, 60°, 180° etc. The swivel eyelet can be adjusted at any desired angle, and an article can be suspended at that angle. The swivel eyelet is safe and easy to use.

6 Claims, 3 Drawing Sheets

SWIVEL EYELET FOR HANGING ARTICLES

FIELD OF INVENTION

The present invention is generally related to eyelets for suspending articles above ground. More particularly, the present invention relates swiveling eyelets for hanging articles, for example, from the ceiling, above the ground.

BACKGROUND OF INVENTION

In general, for hanging article from the ceiling, fixed eyelets are used, which may hang the articles only linearly. If any article needs to be hanged at an angle, angular eyelets are used which hold the articles weight with conventional methods. However, particular type of angular eyelet needs to be selected based upon the angle required to hold the article, and the angular eyelet is fixed at only one angle.

Additionally, other types of hardware, e.g., anchoring devices can be used to hand articles. For example, eye bolts and hoist rings. Eye bolts can be used as a connection point for rigging, anchoring, pulling, or hoisting applications. A swivel hoist ring has the capability of pivoting and/or swiveling to accommodate lifting at angles without incurring damage to the device. Whereas, eye bolts are stationary and can only accommodate angular lifts by factoring in a significant reduction to the working load limit. However, hoist rings are more complex in design and have many moving parts, which makes it difficult and complicated to learn to use and inspect these devices.

As can be seen, many hardware grippers or anchoring devices provide solutions that are available in market are either rigid, complex or are rigid and only one-dimensional.

Hence, there is a need for designing and developing a safe, flexible and easy to use eyelets for suspending articles above ground, at any desired angle.

OBJECTIVES OF THE INVENTION

Thus, the present invention provides a swivel eyelet for suspending articles above ground at any desired angle.

It is an object of the present invention to provide a swivel eyelet that is safe, flexible and easy to use.

Another object of the present invention to provide a swivel eyelet that is utilized by different means and at different angles.

Another object of the present invention is to provide a swivel eyelet that is simple in design and manufacture.

To further clarify the advantages and features of the present invention, a more elaborate description of the invention will be rendered by reference to specific embodiments thereof, which is illustrated in the appended drawings. It is appreciated that these drawings depict only typical embodiments of the invention and are therefore not to be considered limiting of its scope.

SUMMARY OF INVENTION

An aspect of the present invention provides a device for suspending articles above ground, comprising: a swiveling part, pivotably hinged to a load bearing part via a pin; and the load bearing part, pivotably hinged to the swiveling part via the pin, for hanging an article and bearing the load of the article, and the swiveling part and the load bearing part swivels around/about an axis passing through the length of the pin, and each are pivotable and swivels between an angle of 0° to 180°, with respect to each other; and wherein, rotating the device around/about the axis passing through the length of the pin, brings the load bearing part with the hanging article suspended at a desired angle between an angle of 0° to 180° with respect to the swiveling part.

An embodiment of the present invention provides the load bearing part includes a load bearing wire or a rope for hanging the article.

An embodiment of the present invention provides a cable gripper is attached the load bearing wire or rope, and an article, then, is attached to the load bearing wire or rope gripped in the cable gripper.

Another embodiment of the present invention provides the swiveling part swivels around/about the axis passing through the length of the pin between an angle 30°-180°.

An embodiment of the present invention provides the swiveling part is secured to a surface 114 at one end, and attached to the load bearing part at another end.

Another embodiment of the present invention provides the swiveling part is movable along the surface 114 after the article is disengaged from the load bearing part, and is fixed to another position on the surface 114, while the load is again engaged from the load bearing part.

An embodiment of the present invention provides after acquiring a desired angle, the load bearing part is locked at the desired angle using any conventional locking mechanism.

BRIEF DESCRIPTION OF DRAWINGS

For a better understanding of the embodiments of the machine and methods described herein, and to show more clearly how they may be carried into effect, references will now be made, by way of example, to the accompanying drawings, wherein like reference numerals represent like elements/components throughout and wherein.

DETAILED DESCRIPTION OF INVENTION

This patent describes the subject matter for patenting with specificity to meet statutory requirements. However, the description itself is not intended to limit the scope of this patent. The principles described herein may be embodied in many different forms.

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The present invention provides a swivel eyelet for hanging or suspending articles above the ground, e.g., on a ceiling, at any desired angle, example including and not limited to 30°, 45°, 60°, 180° etc. The swivel eyelet can be adjusted at any desired angle, and an article can be suspended at that angle. The swivel eyelet is safe and easy to use.

In an embodiment, the swivel eyelet may have at least two parts: a swiveling part and a load bearing part. The swiveling part is pivotable and swivels between an angle of 0° to 180°, with respect to the load bearing part (or also the surface to which the swiveling part is secured). The load bearing part bears a desired load and is used for hanging any article, of any size, shape and weight, at any desired angle.

Figure 1:
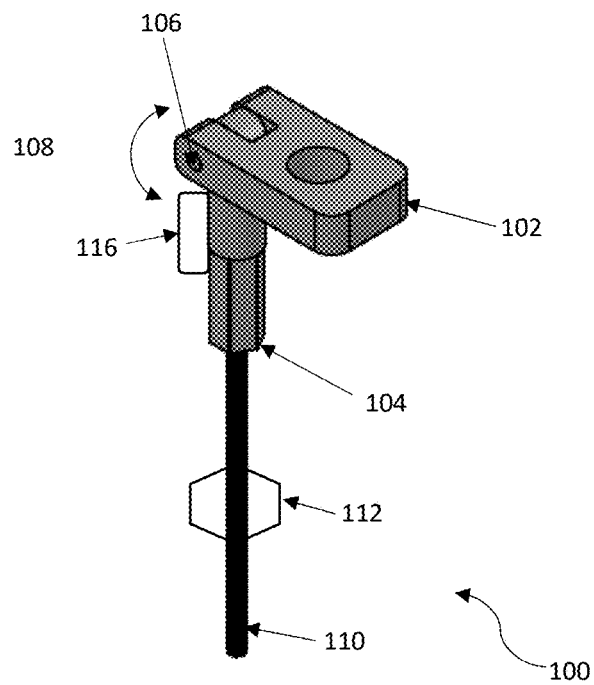
FIG. 1 illustrates an exemplary diagram showing a perspective view of a swivel eyelet, in accordance with an embodiment of the present invention.
Figures 2, 3:
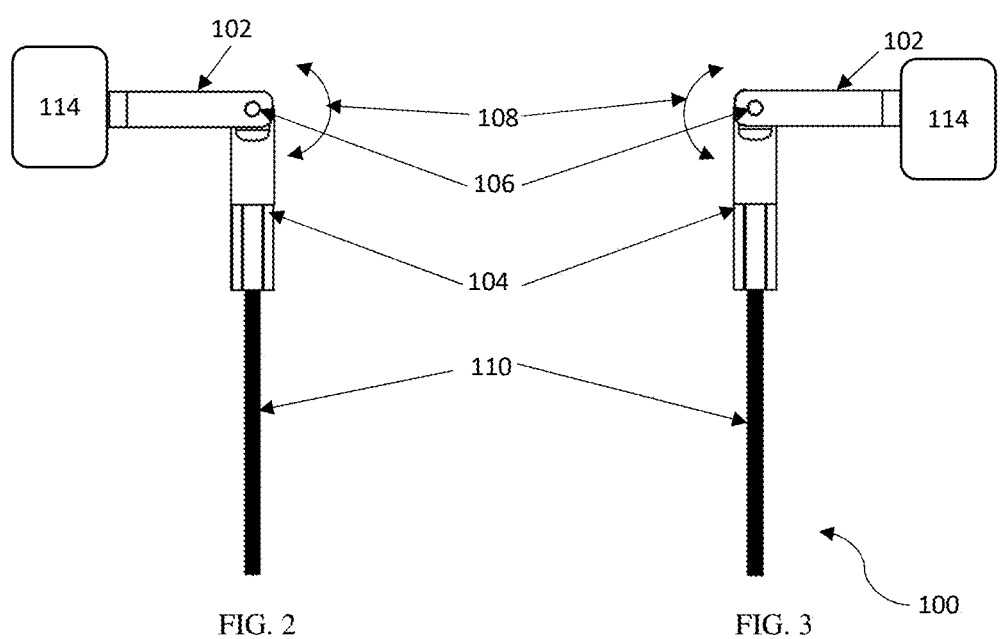
FIG. 2 illustrates an exemplary diagram showing a left side view of the swivel eyelet, in accordance with an embodiment of the present invention.
FIG. 3 illustrates an exemplary diagram showing a right side view of the swivel eyelet, in accordance with an embodiment of the present invention.
Figure 4:
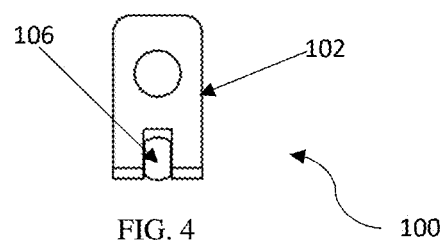
FIG. 4 illustrates an exemplary diagram showing a top view of the swivel eyelet, in accordance with an embodiment of the present invention.
Figure 5:
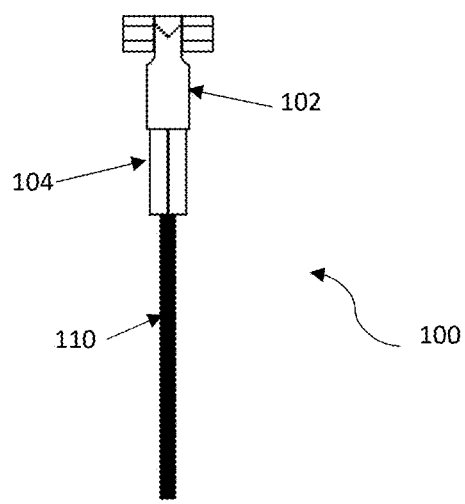
FIG. 5 illustrates an exemplary diagram showing a front view of the swivel eyelet, in accordance with an embodiment of the present invention.
Figure 6:
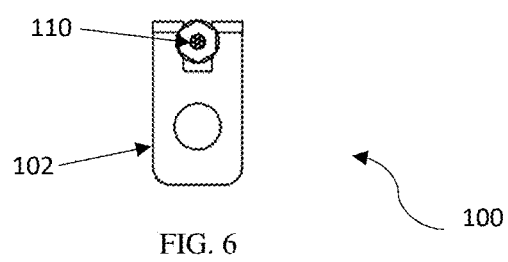
FIG. 6 illustrates an exemplary diagram showing a bottom view of the swivel eyelet, in accordance with an embodiment of the present invention.
Figure 7:
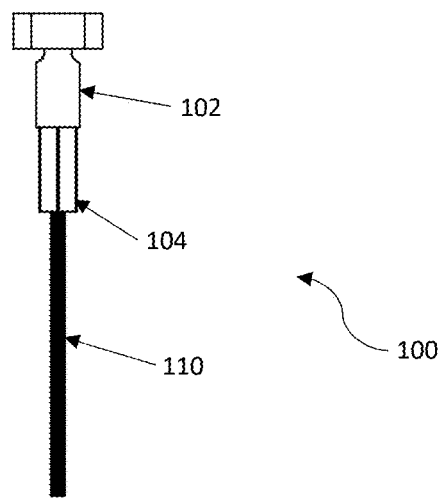
FIG. 7 illustrates an exemplary diagram showing a rear view of the swivel eyelet, in accordance with an embodiment of the present invention.

Referring to FIGS. 1-7, the swivel eyelet 100 includes two parts, a swiveling part 102 and a load bearing part 104. In an embodiment, the swiveling part 102 is safely secured to a surface 114, for example a ceiling. In another embodiment, the swiveling part 102 is detachably fixed to the surface 114 such that the swiveling part 102 is movable along the surface 114 after disengaging a loaded article and fixed to another position on the surface 114. The load bearing part 104 includes a load bearing wire or a rope (flexible element) 110 that hangs an article. In an embodiment, any cable gripper 112 can be attached to the wire 110, and an article, then, can be attached to the wire gripped in the cable gripper 112. In an embodiment, the swiveling part 102 is a swiveling eyelet 102 pivotably hinged to the load bearing part 104 via a pin 106, such that the swiveling part 102 can swivel around an axis passing through the length of pin 106. The movement of swiveling shown by the arrow 108.

In an embodiment, the swiveling part 102 can swivel around/about an axis passing through the length of pin 106 between an angle 0°-180°. In another embodiment, the swiveling part 102 can swivel around an axis passing through the length of pin 106 between an angle 30°-180°.

In another embodiment, the swiveling part 102 is immovably fixed to the surface 114, such that the swiveling part 102 is not pivotable along the surface 114. The swiveling part 102 is fixed to a surface 114, e.g., a ceiling or a wall, whereas the load bearing part 104 with the wire 110 can suspend an article at any possible angle required, because moving the load bearing part 104 (and/or the swiveling part 102 in another embodiment) around the axis passing through the length of pin 106 in the direction of the arrow 108, while it the swiveling part 102 is fixed to the surface 114 at one end, may bring the load bearing part 104 with the attached article suspended at an angle with respect to the swiveling part 102 via the pin 106. For example, a user can use a single swiveling part 102 for his multiple applications at angles including 30°, 45°, 60° etc. The pin 106 in the middle of the swiveling part 102 and the load bearing part 104 provides the flexibility to a solution/application, because (the swiveling part 102 in the other embodiment) the load bearing part 104 is moveable till 180°. The load bearing part 104 automatically aligns with the direction of the loaded article to avoid any twisting force being transmitted through the pin 106.

In an embodiment, after acquiring a particular desired angle, the load bearing part 104 can be locked at the angular position using any conventional locking mechanism 116. In another embodiment, the swiveling part 102 is removably secured to the surface 114, e.g., ceiling, above the ground. In an embodiment, the swiveling part 102 is movable along the surface 114, e.g., ceiling or a wall, after the load is disengaged from the load bearing part 104, and is fixed to a position on the surface 114, while the load is engaged from the load bearing part 104.

Advantageously, the swiveling eyelet of the present invention is a flexible and easy to use hardware for hanging articles at any desired angle, on a surface above the ground. The swiveling eyelet is also safe to use. Owing to its simple design, it is also easy to manufacture. A single swiveling eyelet can be used in multiple applications requiring different angular positions. The swiveling eyelet can be used in wire hanging systems for electrical accessories, HVAC etc.

It is intended that the disclosure and examples be considered exemplary only. Though the present disclosure includes examples from electrical accessories, HVAC, the swiveling eyelet disclosed herein may be employed for various other applications as would be appreciated by one skilled in the art. The references to devices and structures used here are intended to be applied or extended to the larger scope and should not be construed as restricting the scope and practice of the present invention.

While certain embodiments have been described, these embodiments have been presented by way of example only and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure.

The invention claimed is:

1. A device for suspending articles above ground, comprising:
   a swiveling part, immovably fixed to a surface, such that the swiveling part is not pivotable along the surface; and
   a load bearing part, pivotably hinged to the swiveling part via a pin, and flexibly attached to a flexible element for hanging an article via the flexible element and bearing the load of the article, the load bearing part automatically aligns with the direction of the loaded article to avoid any twisting force being transmitted through the pin,
   the load bearing part swivels around/about an axis passing through the length of the pin, and is pivotable and swivels between an angle of 0° to 180°, with respect to the swiveling part; and
   wherein, rotating the device around/about the axis passing through the length of the pin, brings the load bearing part with the hanging article suspended at a desired angle between an angle of 0° to 180° with respect to the swiveling part.

2. The device of claim 1, wherein the load bearing part includes the flexible element which is a load bearing wire or a rope for hanging the article.

3. The device of claim 1, wherein the load bearing part includes the flexible element which is a load bearing wire or rope, and a cable gripper is attached the load bearing wire or rope, and an article, then, is attached to the load bearing wire or rope gripped in the cable gripper.

4. The device of claim 1, wherein the swiveling part, not being pivotable along the surface, is secured to the surface at one end and attached to the load bearing part at another end.

5. The device of claim 1, wherein the swiveling part, not being pivotable along the surface, is movable along the surface such that it is moved and fixed to another position on the surface, after the article is disengaged from the load bearing part and the load is again engaged from the load bearing part.

6. The device of claim 1, wherein, after acquiring a desired angle, the load bearing part is locked at the desired angle using a locking mechanism.

\* \* \* \* \*